US00RE45787E

(19) United States
(12) Reissued Patent
Hurt et al.

(10) Patent Number: US RE45,787 E
(45) Date of Reissued Patent: Nov. 3, 2015

(54) UTILITY BOX

(71) Applicant: Plano Molding Company, Plano, IL (US)

(72) Inventors: Tom Hurt, Elgin, IL (US); John H. Whalen, Sheridan, IL (US)

(73) Assignee: Plano Molding Company, Plano, IL (US)

(21) Appl. No.: 29/498,010

(22) Filed: Jul. 30, 2014

Related U.S. Patent Documents

Reissue of:
(64) Patent No.: Des. 679,908
Issued: Apr. 16, 2013
Appl. No.: 29/418,488
Filed: Apr. 17, 2012

(51) LOC (10) Cl. ..... 03-01

(52) U.S. Cl.
USPC ..... D3/294

(58) Field of Classification Search
USPC ..... D3/293–295, 273, 302, 905, 276, 283, D3/201; 206/349, 372; D7/629; D30/133; D9/420; 220/523, 4.21, 4.22, 529
CPC ..... A01K 97/06
See application file for complete search history.

(56) References Cited

U.S. PATENT DOCUMENTS

| | | | | | |
|---|---|---|---|---|---|
| D253,855 | S | * | 1/1980 | Hopf | D3/295 |
| D278,096 | S | * | 3/1985 | Walker et al. | D3/295 |
| D418,252 | S | * | 12/1999 | Horvath et al. | D28/61 |
| D443,762 | S | * | 6/2001 | Park | D3/295 |
| 6,336,552 | B1 | * | 1/2002 | Meier | 206/3 |
| D468,531 | S | * | 1/2003 | Hsu | D3/282 |
| 7,246,074 | B1 | * | 7/2007 | Hutchins et al. | 705/7.12 |
| 7,246,704 | B2 | * | 7/2007 | Brunson et al. | 206/372 |
| D613,944 | S | * | 4/2010 | Molina | D3/294 |
| D617,987 | S | * | 6/2010 | Wang | D3/294 |
| D645,663 | S | * | 9/2011 | Henley et al. | D3/294 |
| D647,303 | S | * | 10/2011 | Mish et al. | D3/294 |
| D650,173 | S | * | 12/2011 | Lima et al. | D3/293 |
| D670,909 | S | * | 11/2012 | Price | D3/260 |

* cited by examiner

*Primary Examiner* — Phillip S Hyder
(74) *Attorney, Agent, or Firm* — McGuireWoods LLP

(57) CLAIM

We claim the ornamental design for utility box, as shown and described.

DESCRIPTION

Figure 3:
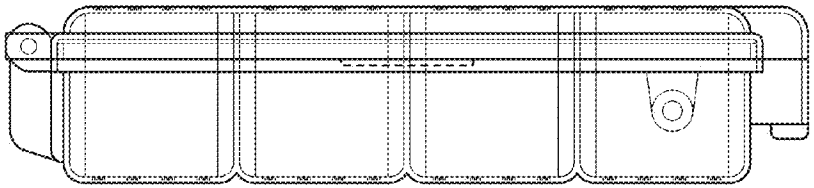
Figure 4:
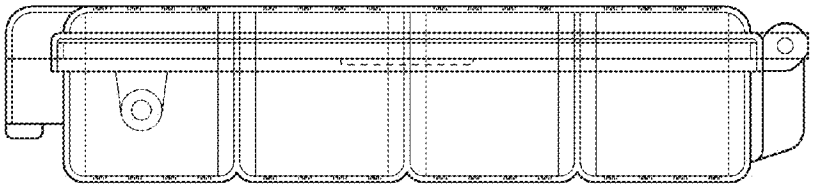

FIG. 1 is a top view of the utility box, without removable inserts;
FIG. 2 is a front view of the utility box shown in FIG. 1[, without removable inserts];
FIG. 3 is a left side view of the utility box shown in FIG. 1[, without removable inserts];
FIG. 4 is a right side view of the utility box shown in FIG. 1[, without removable insets];
FIG. 5 is a bottom view of the utility box shown in FIG. 1[, without removable inserts];
FIG. 6 is an open top perspective view of the utility box shown in FIG. 1[, without removable inserts];
FIG. 7 is an open bottom perspective view of the utility box shown in FIG. 1[, without removable inserts];
FIG. 8 is a top view of the utility box shown in FIG. 1[, with removable inserts inserted into the design];
FIG. 9 is a bottom view of the utility box shown in FIG. 1[, with removable inserts inserted into the design]; and,
FIG. 10 is an open top perspective view of the utility box shown in FIG. 1[, with removable inserts inserted into the design].
The broken lines of the utility box are included for the purpose of showing portions of the article and form no part of the claimed design.

1 Claim, 8 Drawing Sheets

Matter enclosed in heavy brackets [ ] appears in the original patent but forms no part of this reissue; matter printed in italics indicates the additions made by reissue.

Amended

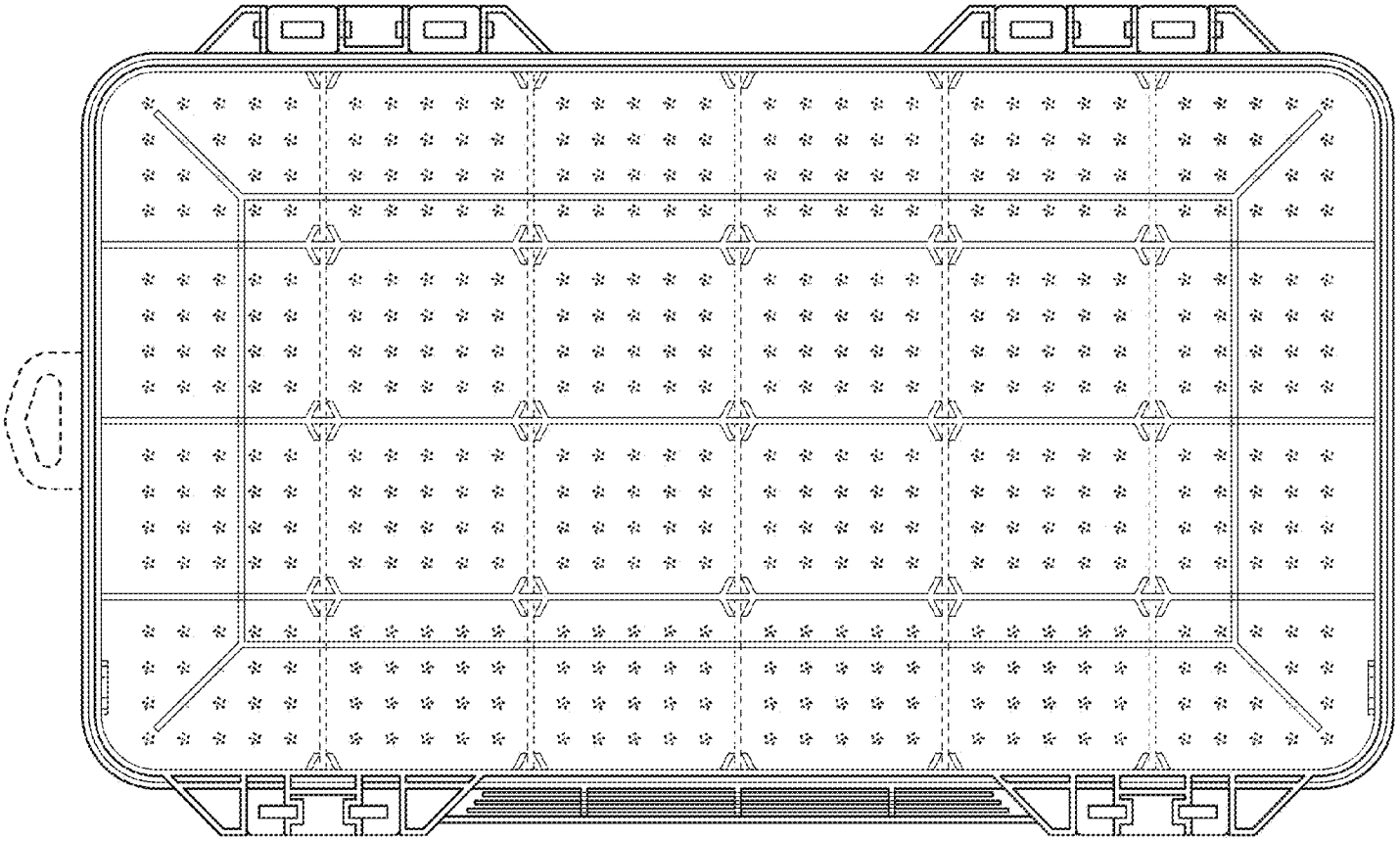
FIG. 1
Amended

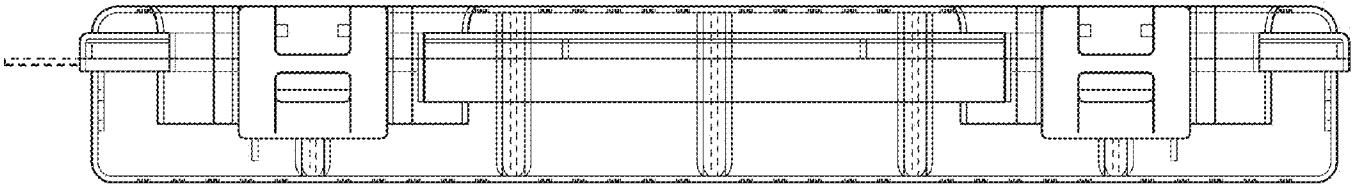
FIG. 2
Amended

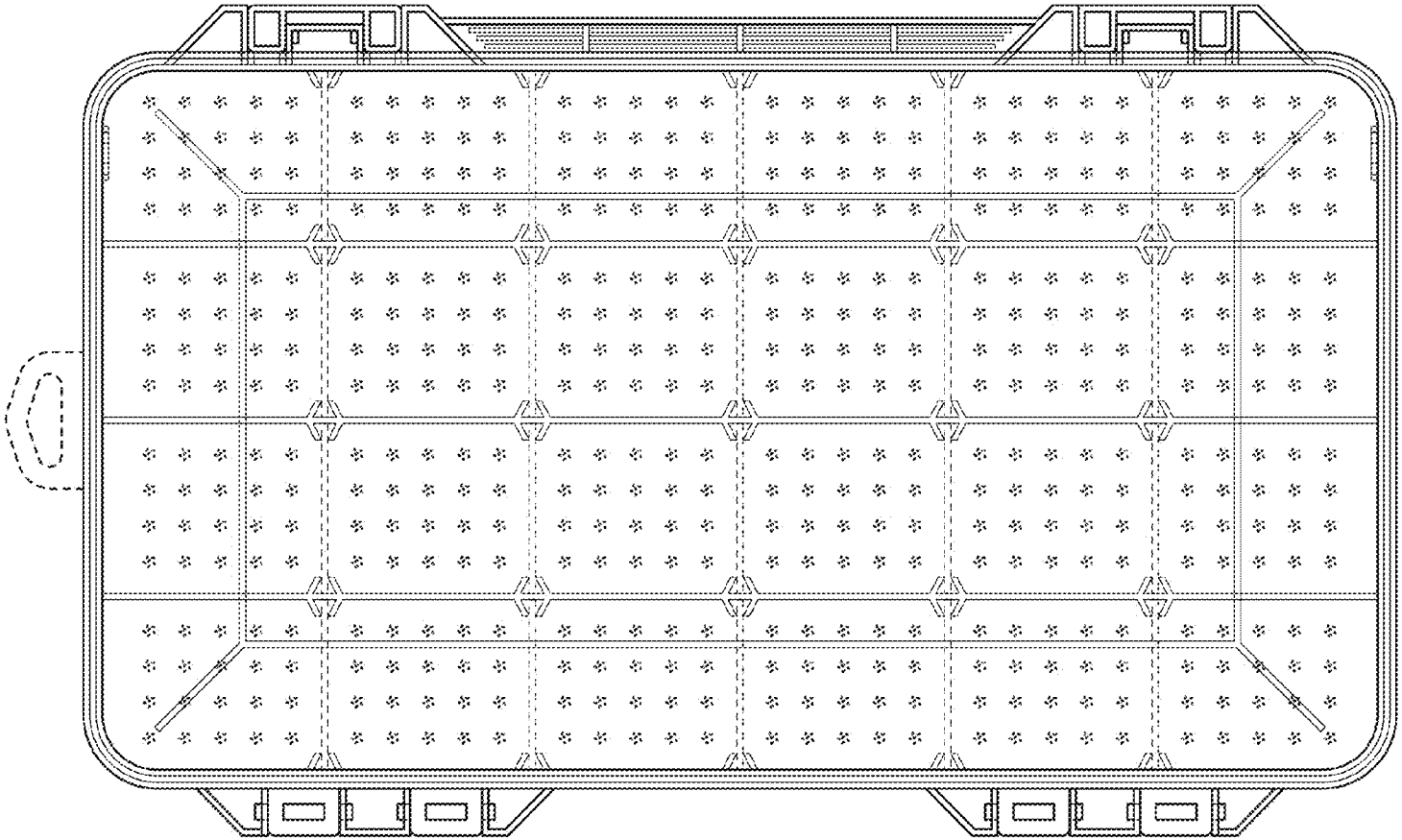
FIG. 5
Amended

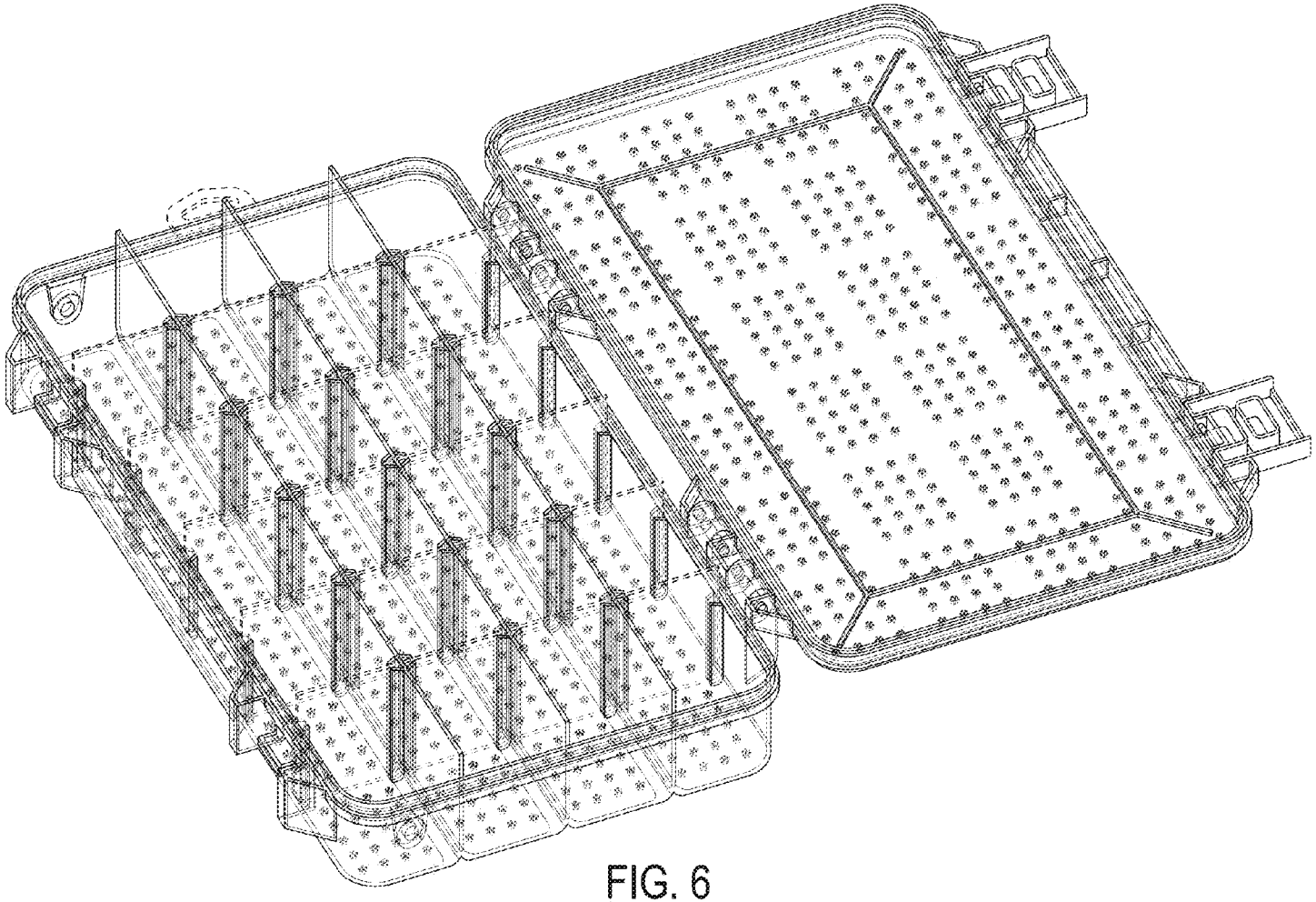
FIG. 6
Amended

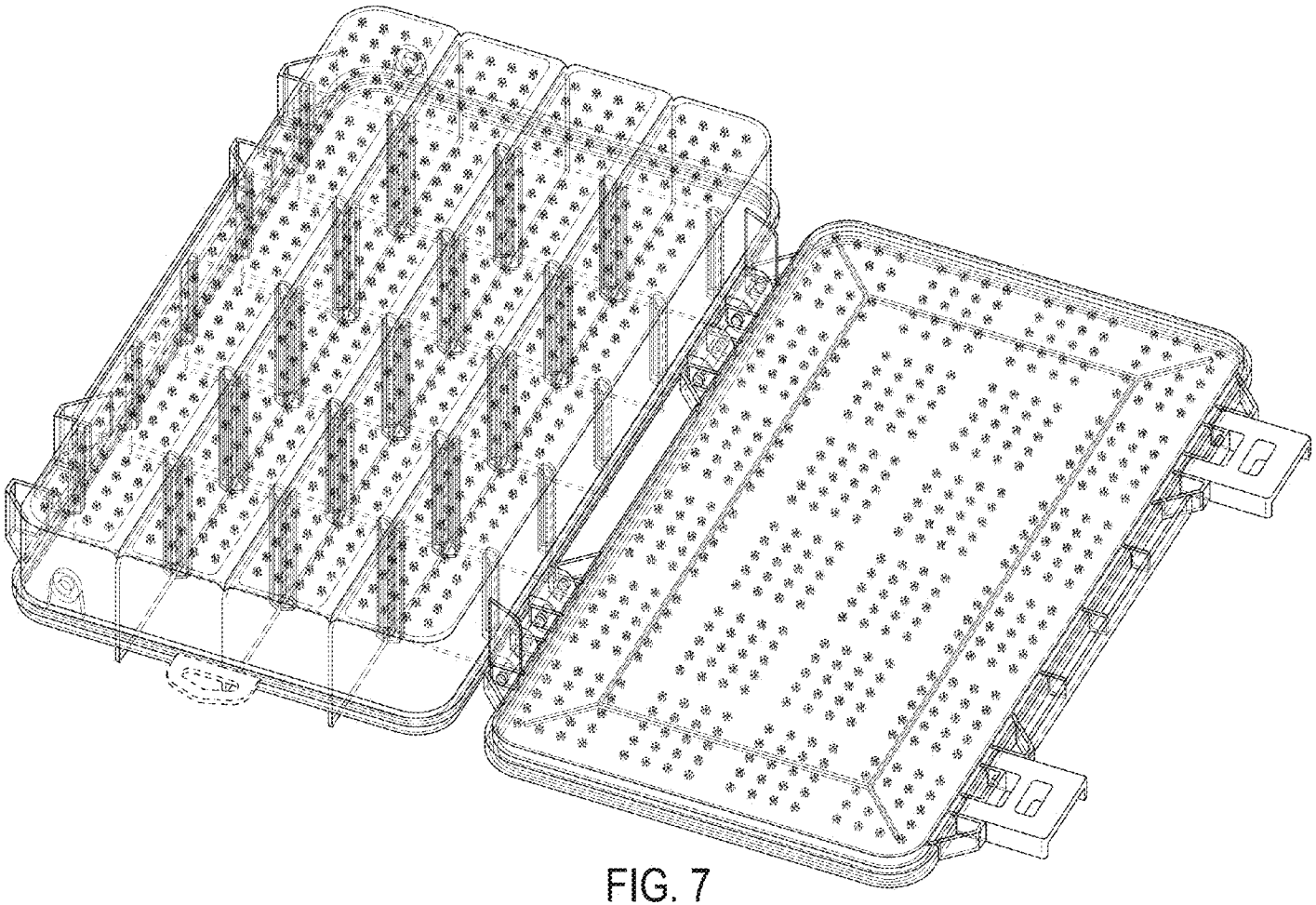
FIG. 7
Amended

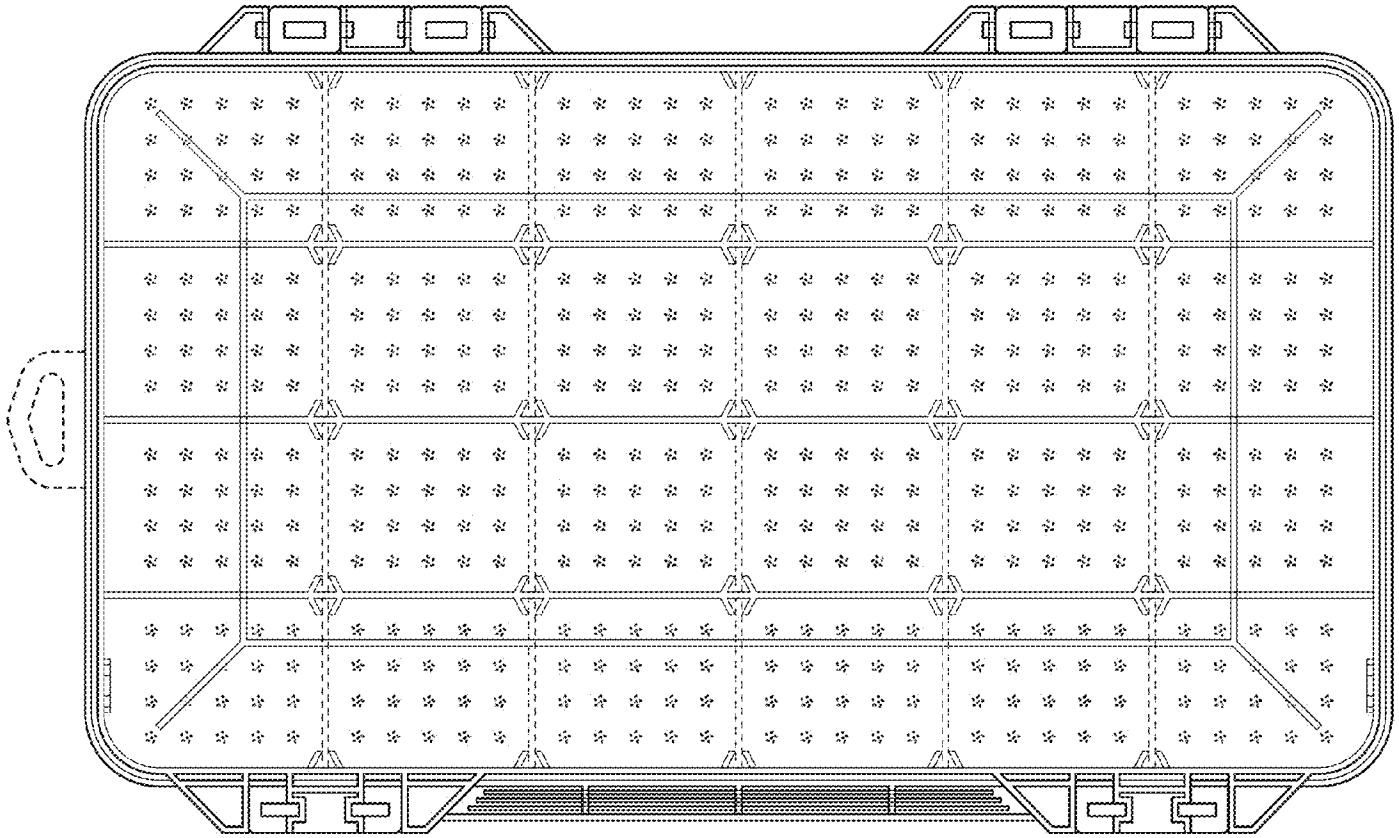
FIG. 8
Amended

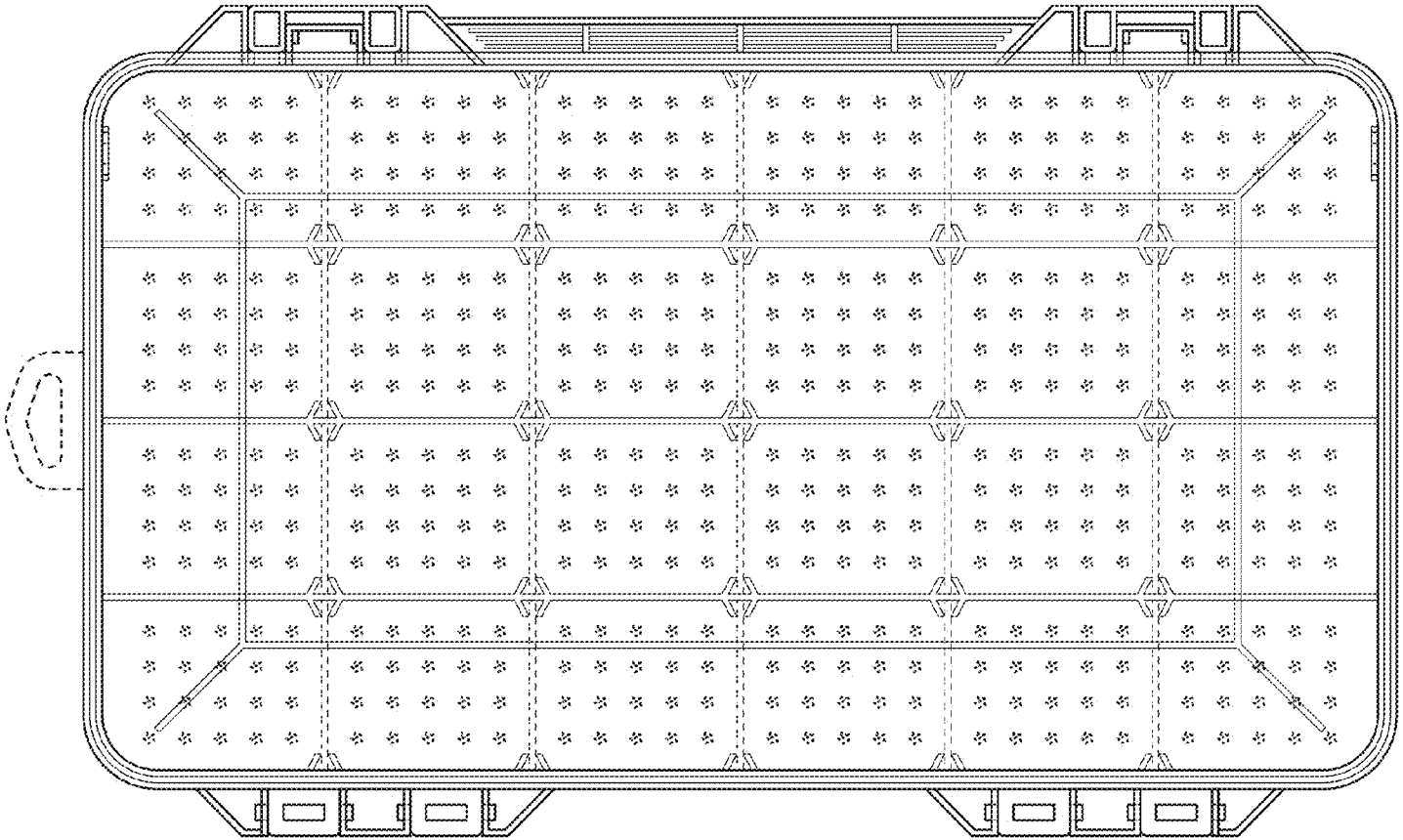
FIG. 9
Amended

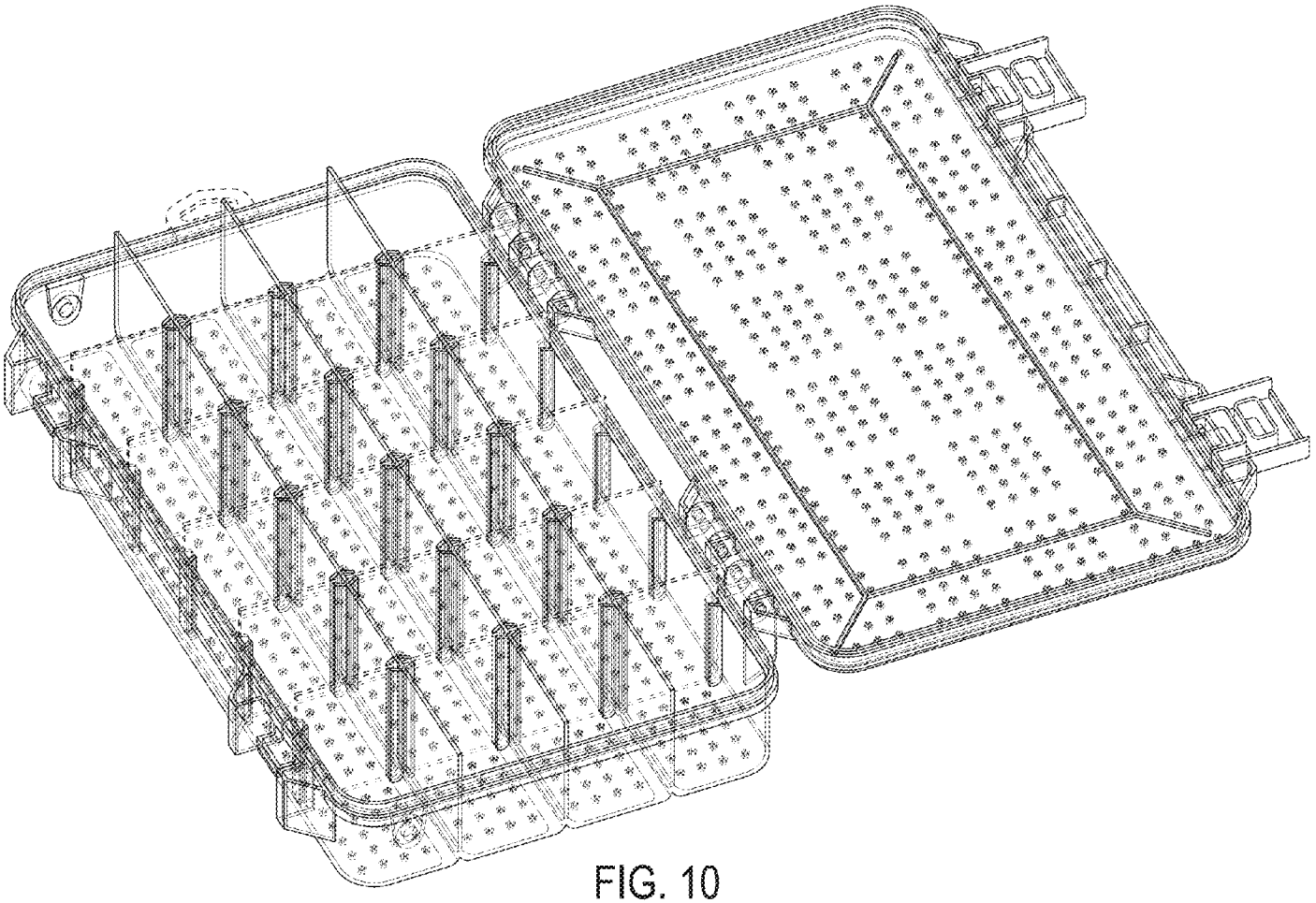
FIG. 10
Amended